(12) United States Patent
Kobayashi

(10) Patent No.: US 8,066,575 B2
(45) Date of Patent: Nov. 29, 2011

(54) CONSTANT VELOCITY UNIVERSAL JOINT AND INNER MEMBER OF THE SAME

(75) Inventor: Masazumi Kobayashi, Iwata (JP)

(73) Assignee: NTN Corporation, Osaka (JP)

( * ) Notice: Subject to any disclaimer, the term of this patent is extended or adjusted under 35 U.S.C. 154(b) by 288 days.

(21) Appl. No.: 12/085,219

(22) PCT Filed: Dec. 11, 2006

(86) PCT No.: PCT/JP2006/324661
§ 371 (c)(1),
(2), (4) Date: May 20, 2008

(87) PCT Pub. No.: WO2007/074630
PCT Pub. Date: Jul. 5, 2007

(65) Prior Publication Data
US 2009/0054165 A1    Feb. 26, 2009

(30) Foreign Application Priority Data
Dec. 26, 2005    (JP) .................... 2005-372554

(51) Int. Cl.
*F16C 3/00*    (2006.01)
(52) U.S. Cl. ........................ 464/145; 464/906
(58) Field of Classification Search .............. 464/145, 464/146, 906, 182; 403/359.5
See application file for complete search history.

(56) References Cited

U.S. PATENT DOCUMENTS

| | | | |
|---|---|---|---|
| 2,844,013 A * | 7/1958 | Spence | 464/145 |
| 4,012,925 A | 3/1977 | Krude | |
| 4,358,282 A | 11/1982 | Yamamoto | |
| 5,542,885 A | 8/1996 | Krude et al. | |
| 5,643,092 A | 7/1997 | Girguis | |
| 6,406,186 B1 * | 6/2002 | Torii et al. | 384/448 |

(Continued)

FOREIGN PATENT DOCUMENTS

DE    24 61 289    11/1975

(Continued)

OTHER PUBLICATIONS

Supplementary European Search Report dated Apr. 7, 2010 in corresponding European Application No. 06834416.7.

(Continued)

*Primary Examiner* — Aaron Dunwoody
(74) *Attorney, Agent, or Firm* — Wenderoth, Lind & Ponack, L.L.P.

(57) ABSTRACT

Automatic installation of a circlip is facilitated even when an axial length (inner race width) of a protrusion of an inner race is reduced. An inner race is installed in a constant velocity universal joint for transmitting torque while allowing angular displacement between itself and an outer race, with a shaft being inserted in a shaft hole formed in an inner bore to be spline-fitted thereto so as to be prevented from coming off by virtue of the circlip. A two-step chamfer having different chamfer angles is provided at a shaft insertion side end portion of the shaft hole. The two-step chamfer includes a first chamfer section situated on a shaft hole opening side and a second chamfer section provided on the side opposite to the shaft hole opening so as to be continuous with the first chamfer section. The chamfer angle α of the first chamfer section is set larger than the chamfer angle β of the second chamfer section.

12 Claims, 9 Drawing Sheets

U.S. PATENT DOCUMENTS 6,644,858 B2 * 11/2003 Torii et al. .................. 384/448
2005/0261066 A1 * 11/2005 Nakagawa et al. ............ 464/145

FOREIGN PATENT DOCUMENTS

| DE | 44 29 256 | 2/1996 |
|---|---|---|
| GB | 1 483 130 | 8/1977 |
| JP | 6-502906 | 3/1994 |
| JP | 06-193642 | 7/1994 |
| JP | 3188001 | 5/2001 |

OTHER PUBLICATIONS

International Search Report mailed Jan. 9, 2007 for International Application No. PCT/JP2006/324661.

* cited by examiner

CONSTANT VELOCITY UNIVERSAL JOINT AND INNER MEMBER OF THE SAME

TECHNICAL FIELD

The present invention relates to a fixed-type or a sliding-type constant velocity universal joint which is employed in a power transmission system of an automobile or various industrial machines and is incorporated in a drive shaft or a propeller shaft employed in, for example, a 4WD vehicle or an FR vehicle. The present invention also relates to an inner member constituting a part of the constant velocity universal joint.

BACKGROUND ART

A fixed-type constant velocity universal joint (Rzeppa type constant velocity universal joint: BJ) has been employed as a connection joint for a drive shaft or the like of an automobile. For example, such a universal joint includes: an outer race serving as an outer member and having curved track grooves formed axially in a spherical inner diameter surface; an inner race serving as an inner member and having curved track grooves formed axially in a spherical outer diameter surface; a plurality of torque transmission balls arranged in respective ball tracks each constituted by one of the track grooves of the outer race in combination with the corresponding track groove of the inner race; and a retainer having pockets for holding those balls. The plurality of balls are accommodated in respective pockets formed in the retainer and are arranged at regular intervals in the circumferential direction.

When this constant velocity universal joint is employed in a drive shaft, a shaft portion (driven shaft) integrally extending from one end of the outer race in the axial direction thereof is connected to a wheel-bearing apparatus, and a shaft (driving shaft) spline-fitted into a shaft hole of the inner race is connected to a sliding-type constant velocity universal joint. Even when the outer race and the inner race are angularly displaced between the respective two axes of the shaft portion of the outer race and the shaft of the inner race side, each of the balls accommodated in the pockets of the retainer is always held in a plane bisecting an operational angle at any operational angle. Therefore, the constant velocity of the joint is ensured. In this case, the operational angle represents an angle formed by the shaft portion of the outer race and the shaft of the inner race.

As described above, a shaft is connected to the shaft hole of the inner race of a constant velocity universal joint. In this connection structure of the inner race and the shaft, the shaft is spline-fitted to the shaft hole of the inner race, and is prevented from coming off by virtue of a circlip (see, for example, Patent Document 1). In the connection structure disclosed in Patent Document 1, a chamfer is provided at the shaft insertion side end portion of the shaft hole of the inner race so as to facilitate the automatic installation of the circlip.

FIGS. 9 to 12 illustrate how a shaft 113 is installed in an inner race 106 of a configuration as disclosed in Patent Document 1. As shown in the drawings, a spline 117 is formed on the inner peripheral surface of a shaft hole 112 of the inner race 106, and a chamfer 120 is provided at the shaft insertion side end portion of the shaft hole 112. A chamfer angle β is set to be 32.5° or less, more preferably, not less than 15° but not more than 32.5°. Further, in order that the shaft 113 may be allowed to be inserted as it is into the shaft hole 112 of the inner race 106 even in a state in which a circlip 115 previously mounted to a recessed groove 114 formed at an end portion of the shaft 113 is drooping due to the weight of the circlip 115, the radius $R_2$ of the opening end of the chamfer 120 is set larger than the radius $R_1$ when the circlip 115 of the shaft 113 is drooping therefrom due to the weight of the circlip 115 (see FIG. 9).

When installing the shaft 113 in the shaft hole 112 of the inner race 106, as shown in FIG. 9, the shaft 113 is first arranged coaxially with respect to the shaft hole 112 of the inner race 106. Then, a state is attained in which the circlip 115 is drooping from a shaft end portion of the shaft 113.

When, in this state, the shaft 113 is inserted into the shaft hole 112 of the inner race 106 as shown in FIG. 10, the circlip 115 is guided by a tapered surface of the chamfer 120 of the inner race 106 to undergo automatic alignment.

When, thereafter, the shaft 113 is further inserted into the shaft hole 112 of the inner race 106 as shown in FIG. 11, the circlip 115 passes through the shaft hole 112 while reduced to the spline small diameter of the inner race 106.

When, as shown in FIG. 12, the shaft end portion of the shaft 113 is inserted to a position where the shaft end portion of the shaft 113 protrudes from the inner race 106, the circlip 115 is diverged at the position of a step portion 116 formed at the shaft hole opening end of the inner race 106, and the shaft 113 is prevented from coming off by virtue of the circlip 115.

[Patent Document 1] JP 3188001 B

DISCLOSURE OF THE INVENTION

Problem to be Solved by the Invention

In the above-mentioned constant velocity universal joint, when performing automatic installation of the circlip 115, a protrusion 119 is provided at a shaft insertion side end portion of the inner race 106 so that the tapered surface length of the chamfer 120 of the inner race 106 may be augmented to allow the circlip 115 to be smoothly reduced in diameter while undergoing automatic alignment. The end portion of the inner race 106 is formed in a protruding configuration taking into consideration the installation property of the inner race 106 and the cage.

On the other hand, to improve the automatic installation property of the circlip 115, it is desirable for a taper angle of the chamfer 120 of the inner race 106, that is, a chamfer angle β, to be small. However, it should be noted that, the smaller the chamfer angle β is made while securing the effective spline fit length of the inner race 106, the larger the axial length of the protrusion 119 becomes, with the result that the axial length of the inner race 106, that is, the inner race width, increases. This leads to an increase in production cost of the joint, and an increase in weight of the joint as a whole.

It is accordingly an object of the present invention to provide a constant velocity universal joint and an inner member thereof capable of facilitating automatic installation of the circlip even when the axial length of the protrusion of the inner race (inner race width) is reduced.

Means for Solving the Problems

The present invention provides an inner member provided in a constant velocity universal joint for transmitting torque while allowing angular displacement between itself and an outer member, with a shaft being inserted into a shaft hole formed in an inner bore to be spline-fitted thereto so as to be prevented from coming off by virtue of a lock member, including a two-step chamfer of different chamfer angles provided at a shaft insertion side end portion of the shaft hole.

The two-step chamfer includes a first chamfer section situated on the shaft hole opening side and a second chamfer section provided on the side opposite to the shaft hole opening so as to be continuous with the first chamfer section, and it is desirable that the chamfer angle of the first chamfer section be set larger than the chamfer angle of the second chamfer section. Further, it is desirable that the first chamfer section have a chamfer angle of 32.6° to 60°, and that the second chamfer section have a chamfer angle of 15° to 32.5°.

The first chamfer of the two-step chamfer serves to allow the shaft to be inserted as it is into a shaft hole of the inner race while effecting automatic alignment on the circlip even in a state in which the circlip, which is previously mounted to a recessed groove formed at the end portion of the shaft, is drooping due to the weight of the circlip. The second chamfer serves to effect a reduction in diameter of the circlip after the automatic alignment of the circlip.

In this way, there is provided the two-step chamfer formed of the first chamfer section of large chamfer angle and the second chamfer of the small chamfer angle, whereby automatic installation of the circlip is facilitated. Further, since the chamfer angle of the first chamfer section is larger than that of the second chamfer section, it is possible to reduce an axial length of a protrusion of the inner race (inner race width).

That is, in the case in which the chamfer angle of the second chamfer section is equal to that in the related art, the chamfer angle of the first chamfer section is larger than that in the related art, so the axial length of the inner member can be made to be smaller.

By adding to the inner member constructed as described above the outer member and a torque transmission member existing between the outer member and the inner member and transmitting torque, it is possible to form a constant velocity universal joint.

Effect of the Invention

According to the present invention, a two-step chamfer of different chamfer angles is provided at a shaft insertion side end portion of the shaft hole, whereby it is possible to provide an automatic installation capability equivalent to that in the related art. Due to a reduction in axial length of the inner member, it is possible to achieve a reduction in weight and cost of the inner member, thus making it possible to provide a light and compact constant velocity universal joint of a satisfactory automatic installation property.

DETAILED DESCRIPTION OF THE INVENTION

Hereinafter, an embodiment of the present invention is described. The embodiment described below exemplifies the case in which the present invention is applied to a fixed-type (Rzeppa type) constant velocity universal joint (BJ). However, the present invention is applicable to other constant velocity universal joints such as a fixed-type (undercut free type) constant velocity universal joint (UJ), a sliding-type (cross groove type) constant velocity universal joint (LJ), a sliding-type (double offset type) constant velocity universal joint (DOJ), and a sliding-type (tripod type) constant velocity universal joint (TJ).

A constant velocity universal joint of an embodiment shown in FIGS. 7 and 8 includes: an outer race 3 serving as an outer member and having curved track grooves 2 formed axially in a spherical inner diameter surface 1; an inner race 6 serving as an inner member and having curved track grooves 5 formed axially in a spherical outer diameter surface 4; eight torque transmission balls 7 arranged in respective ball tracks each constituted by one of the track grooves 2 of the outer race 3 in combination with the corresponding track groove 5 of the inner race 6; and a retainer 9 having pockets 8 for holding those balls 7. The eight balls 7 are accommodated in the respective pockets 8 formed in the retainer 9 and are arranged at regular intervals in the circumferential direction.

A center of curvature $O_1$ of each of the track grooves 2 of the outer race 3 and a center of curvature $O_2$ of the corresponding track groove 5 of the inner race 6 are axially offset in respective opposite directions by the same distance with respect to a joint central surface O including the center of the ball 7. Therefore, each of the ball tracks has a wedge-like shape in which the width is large at an opening side and gradually reduces toward an inner side. Each spherical center of the inner diameter surface 1 of the outer race 3 and the outer diameter surface 4 of the inner race 6 is coincident with the joint central surface O.

If the constant velocity universal joint having the above-mentioned configuration is employed in a drive shaft of an automobile, a shaft portion 11 (driven shaft) integrally extending from the bottom portion of a mouth portion 10 of the outer race 3 is connected to a wheel-bearing apparatus (not shown). In addition, a shaft 13 (driving shaft) spline-fitted into a shaft hole 12 of the inner race 6 is connected to a sliding-type constant velocity universal joint (not shown). Due to the connection of the inner race 6 and the shaft 13 through spline fitting, torque can be transmitted therebetween.

This constant velocity universal joint has a structure in which torque can be transmitted between two axes of the shaft portion 11 of the outer race 3 and the shaft 13 of the inner race side while operational angular displacement between the two axes is allowed. Specifically, when the outer race 3 is angularly displaced with respect to the inner race 6 by an angle θ, each of the balls 7 guided by the retainer 9 is always held in a plane (at θ/2) bisecting the operational angle θ at any operational angle θ, thereby ensuring the constant velocity characteristics of the joint.

A circlip 15 serving as a locking member fitted into an annular recess groove 14 which is provided in the distal end portion of the shaft 13 is locked to a step portion 16 provided in an inner end portion of the shaft hole 12 of the inner race 6. In this manner, the shaft 13 inserted into the shaft hole 12 of the inner race 6 to be spline-fitted is prevented from being disconnected.

For comparison of the inner race configuration of the embodiment of the present invention with that in the related art, FIG. 1B shows the inner race 6 of the embodiment of the present invention, and FIG. 1A shows the inner race 106 in the related art.

As shown in FIG. 1B the inner race 6 of this constant velocity universal joint has at a shaft insertion side end portion of the shaft hole 12 a two-step chamfer 20 of different chamfer angles α and β. The two-step chamfer 20 includes a first chamfer section 21 situated at the shaft hole opening side and a second chamfer section 22 provided on the side opposite to the shaft hole opening side so as to be continuous with the first chamfer section 21, with the chamfer angle α of the first chamfer section 21 being set larger than the chamfer angle β of the second chamfer section 22. The first chamfer section 21 has a chamfer angle α of 32.6° to 60°, and the second chamfer section 22 has a chamfer angle β of 15° to 32.5°, which is equivalent to that in the related art.

The first chamfer 21 of the two-step chamfer 20 serves to allow the shaft 13 to be inserted as it is into the shaft hole 12 of the inner race 6, with the circlip 15 undergoing automatic alignment, even in a state in which the circlip 15 previously mounted to the recessed groove 14 formed at the end portion of the shaft 13 is drooping due to the weight of the circlip 15.

The radius $R_3$ of the inner race 6 at the opening end must be equivalent to the radius $R_2$ of the opening end portion of the inner race 106 in the related art ($R_3=R_2$).

The second chamfer section 22 serves to reduce the diameter of the circlip 15 after the automatic alignment of the circlip 15. The radius $R_4$ of the boundary portion between the second chamfer section 22 and the first chamfer section 21 must be larger than the maximum radius $R_5$ of the circlip 15 shown in FIG. 2 ($R_4>R_5$).

FIGS. 3 to 6 illustrate how the shaft 13 is installed in the inner race 6 of this embodiment.

When installing the shaft 13 in the shaft hole 12 of the inner race 6, the shaft 13 is first arranged coaxially with respect to the shaft hole 12 of the inner race 6 as shown in FIG. 3. Then, a state is attained in which the circlip 15 is drooping at the axial end of the shaft 13.

When, in this state, the shaft 13 is inserted into the shaft hole 12 of the inner race 6 as shown in FIG. 4, the circlip 15 is guided by a tapered surface of the first chamfer section 21 of the two-step chamfer 20 of the inner race 6 to undergo automatic alignment.

After that, the shaft 13 is further inserted into the shaft hole 12 of the inner race 6 as shown in FIG. 5, then, the circlip 15 passes through the shaft hole 12 while guided by a tapered surface of the second chamfer section 22 of the two-step chamfer 20 of the inner race 6, with the diameter of the circlip 15 being reduced to the spline small diameter.

When, as shown in FIG. 6, the axial end portion of the shaft 13 is inserted to a position where the axial end portion of the shaft 13 protrudes from the inner race 6, the circlip 15 is diverged at the position of the step portion 16 formed at the shaft hole opening end of the inner race 6, and the shaft 13 is prevented from coming off by virtue of the circlip 15.

Due to the provision of the first chamfer section 21 whose chamfer angle $\alpha$ is large and the second chamfer section 22 whose chamfer angle $\beta$ is small, the automatic installation of the circlip 15 is facilitated, and since the first chamfer section 21 has a larger chamfer angle than the second chamfer section 22 ($\alpha>\beta$), it is possible, as shown in FIG. 1B, to make the axial length $m_1$ of a protrusion 19 of the inner race 6 (inner race width $L_1$) smaller than the axial length $m_2$ of a protrusion 119 of the inner race 106 (inner race width $L_2$) in the related art ($m_1<m_2$, $L_1<L_2$).

That is, when the chamfer angle $\beta$ of the second chamfer section 22 is equivalent to that in the related art, the chamfer angle $\alpha$ of the first chamfer section 21 is larger than that in the related art, so it is possible to make the axial length of the inner race 6, that is, the inner race width $L_1$, so much the smaller.

DESCRIPTION OF SYMBOLS

Figure 1A:
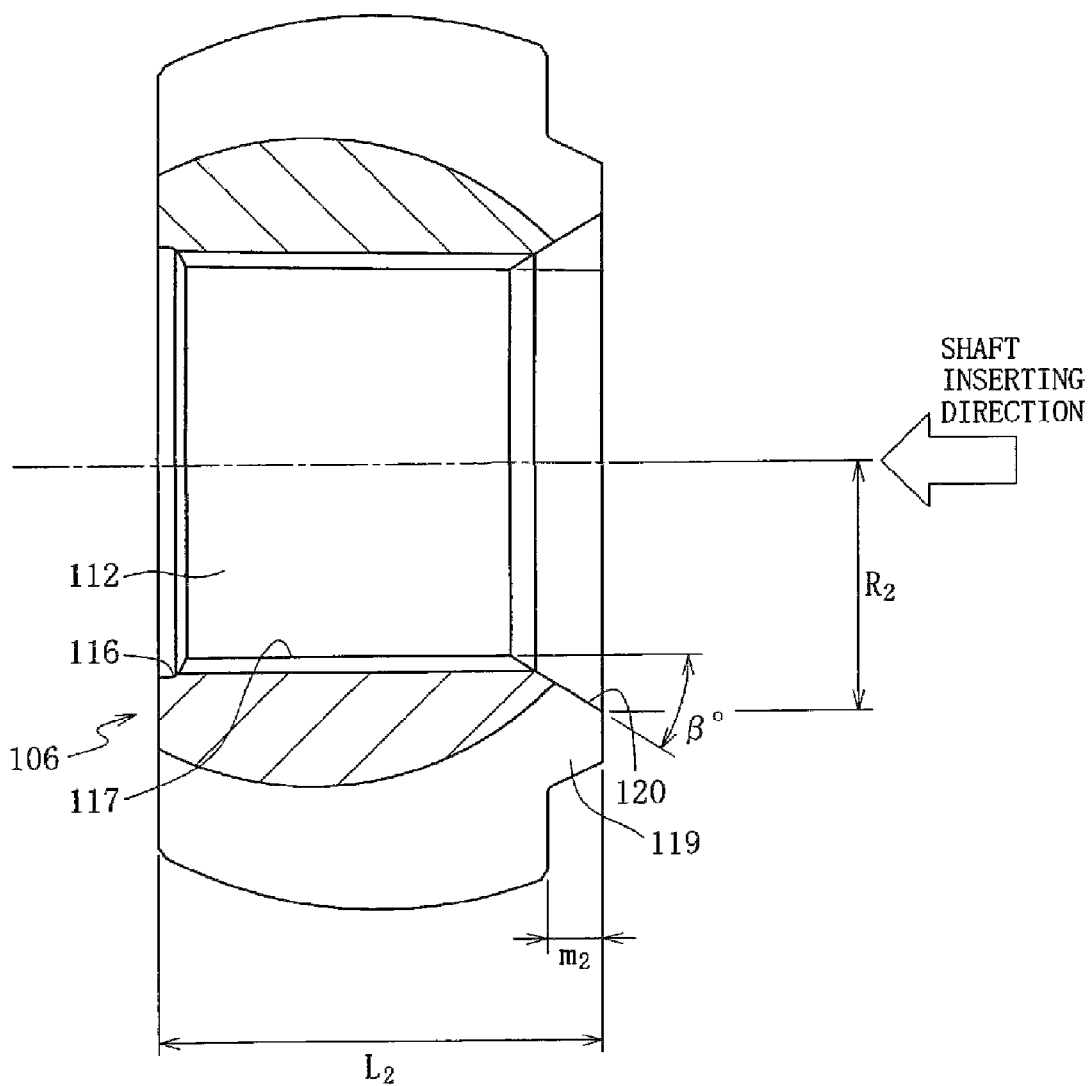
FIG. 1A shows a sectional view of an inner race configuration of the related art.
Figure 1B:
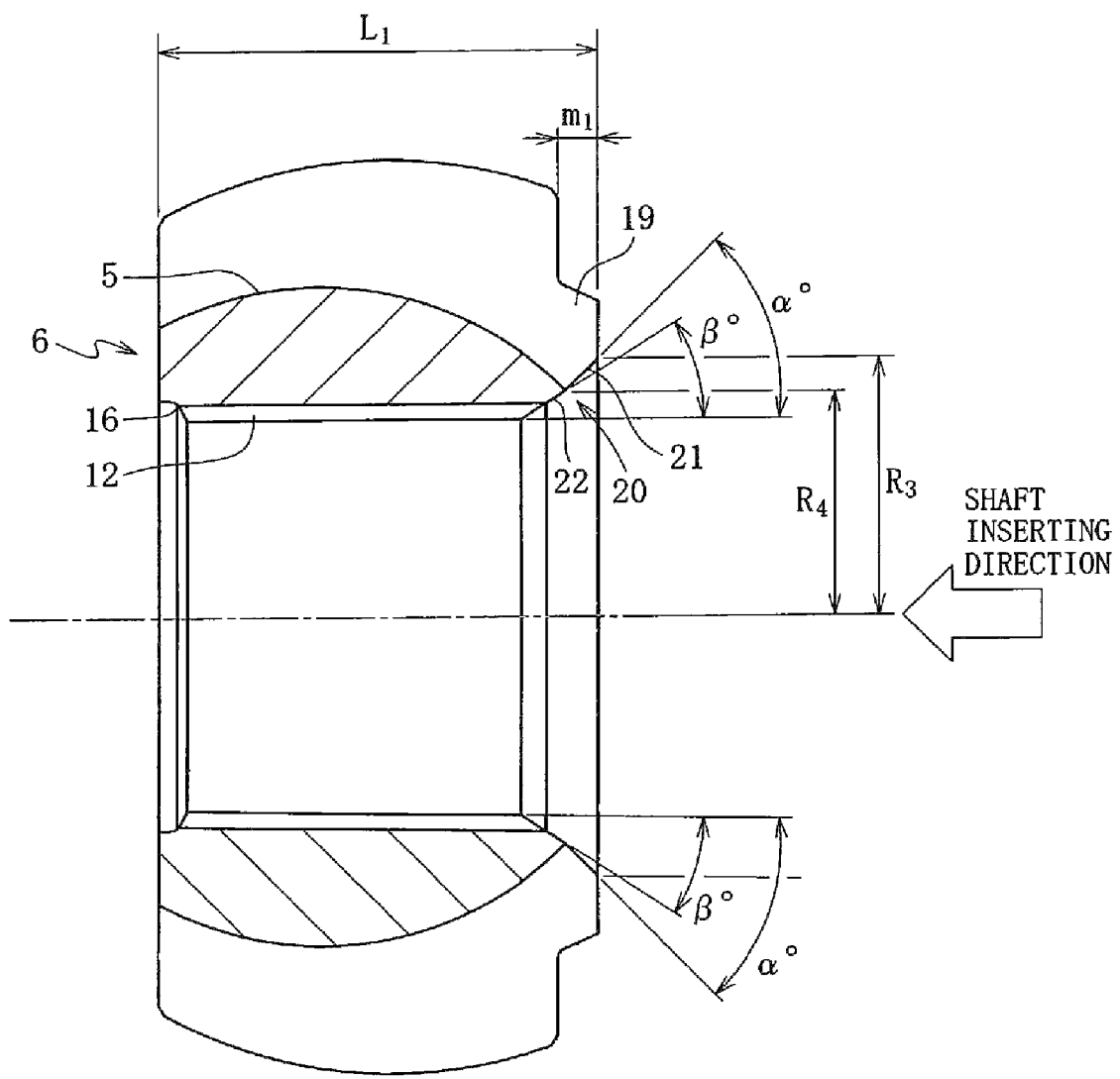
FIG. 1B shows a sectional view of an inner race configuration of an embodiment of the present invention.
Figure 1C:
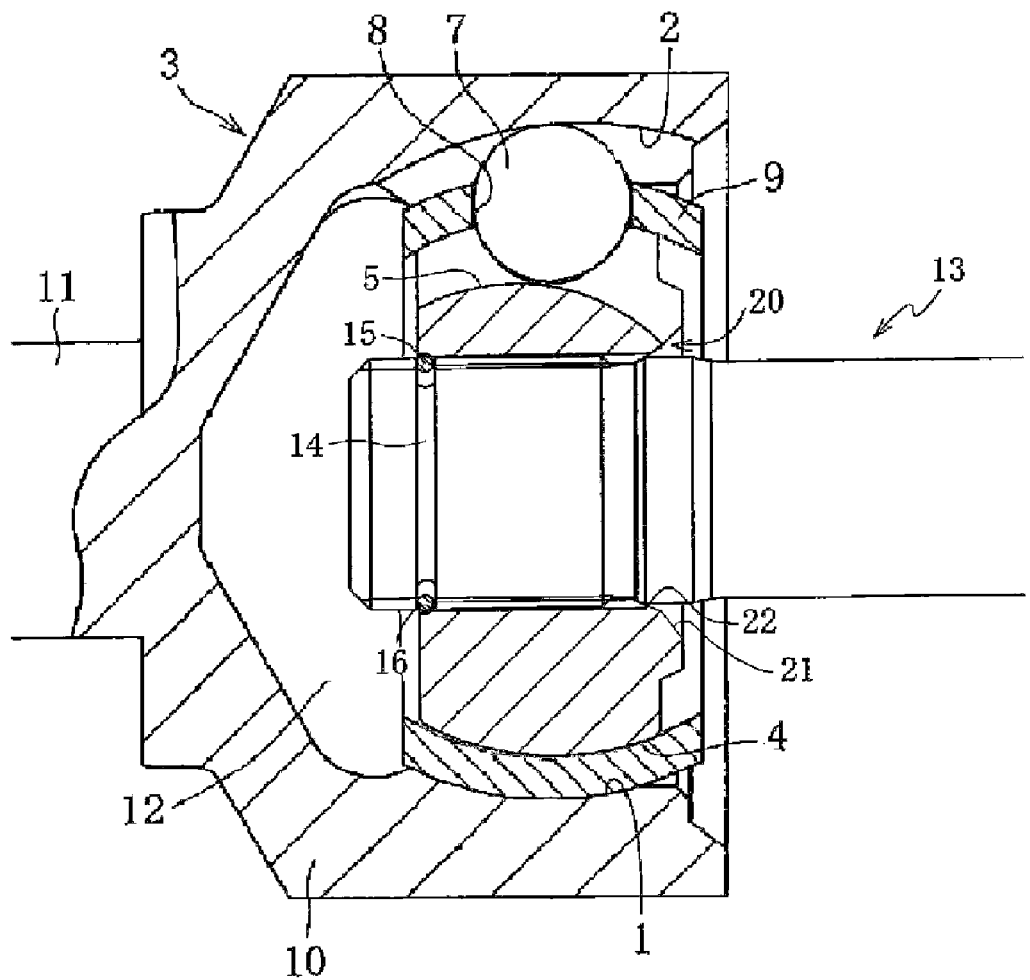
FIG. 1C shows an example of the construction of a fixed-type velocity universal joint of the present invention.
Figure 2:
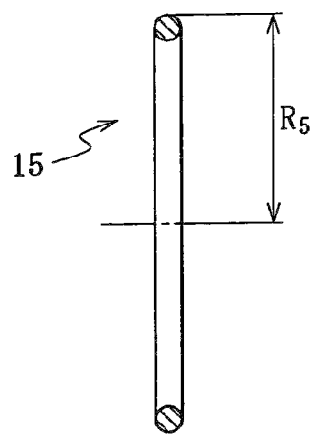
FIG. 2 shows a sectional view of a circlip of the embodiment of the present invention.
Figure 3:
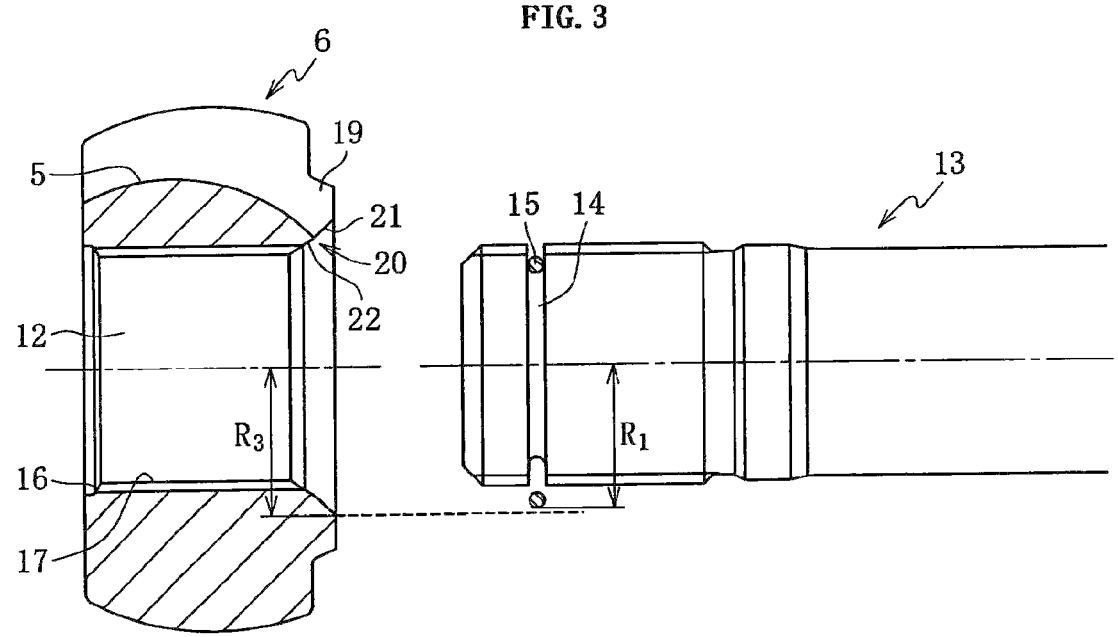
FIG. 3 shows a sectional view showing a state in which a shaft is arranged coaxially with respect to the inner race in the embodiment of the present invention.
Figure 4:
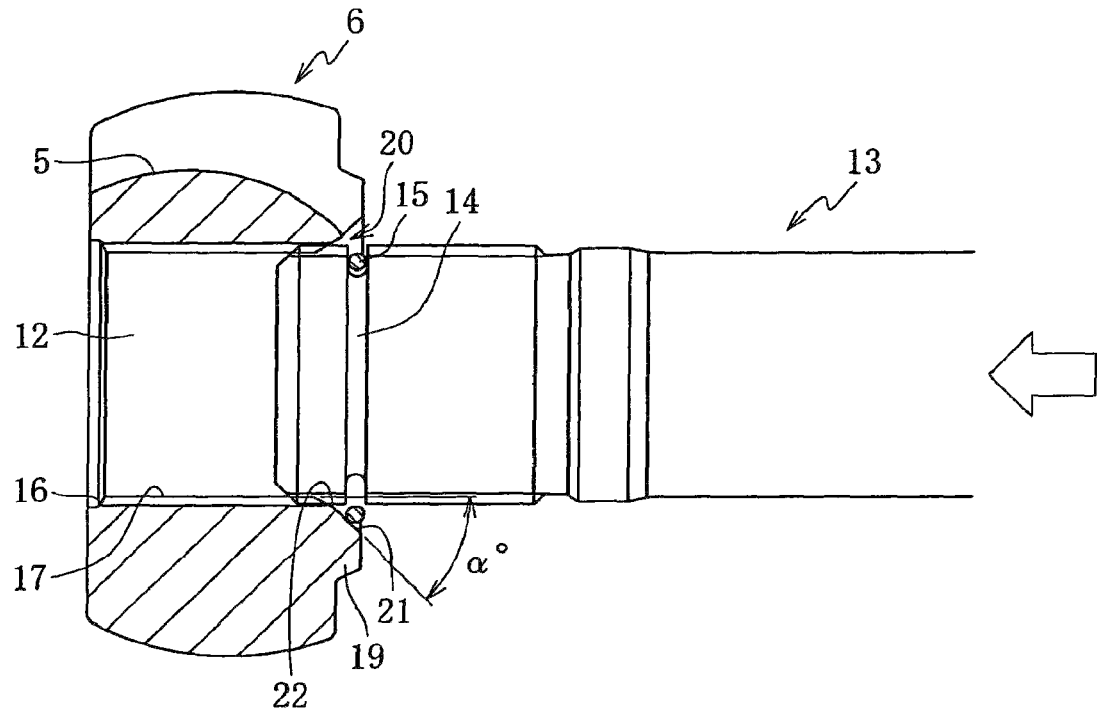
FIG. 4 shows a sectional view showing a state in which the shaft is inserted into the inner race in the embodiment of the present invention, with the circlip undergoing automatic alignment by a first chamfer section of the inner race.
Figure 5:
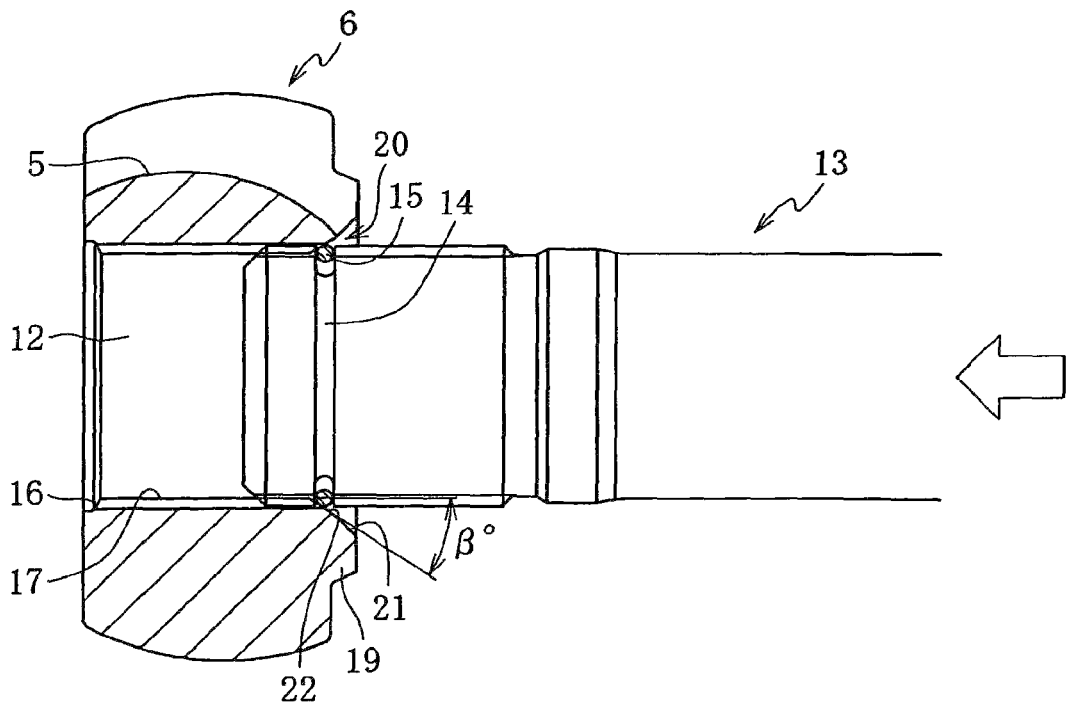
FIG. 5 shows a sectional view showing a state in which the shaft is inserted into the inner race in the embodiment of the present invention, with the circlip being reduced in diameter by a second chamfer section of the inner race.
Figure 6:
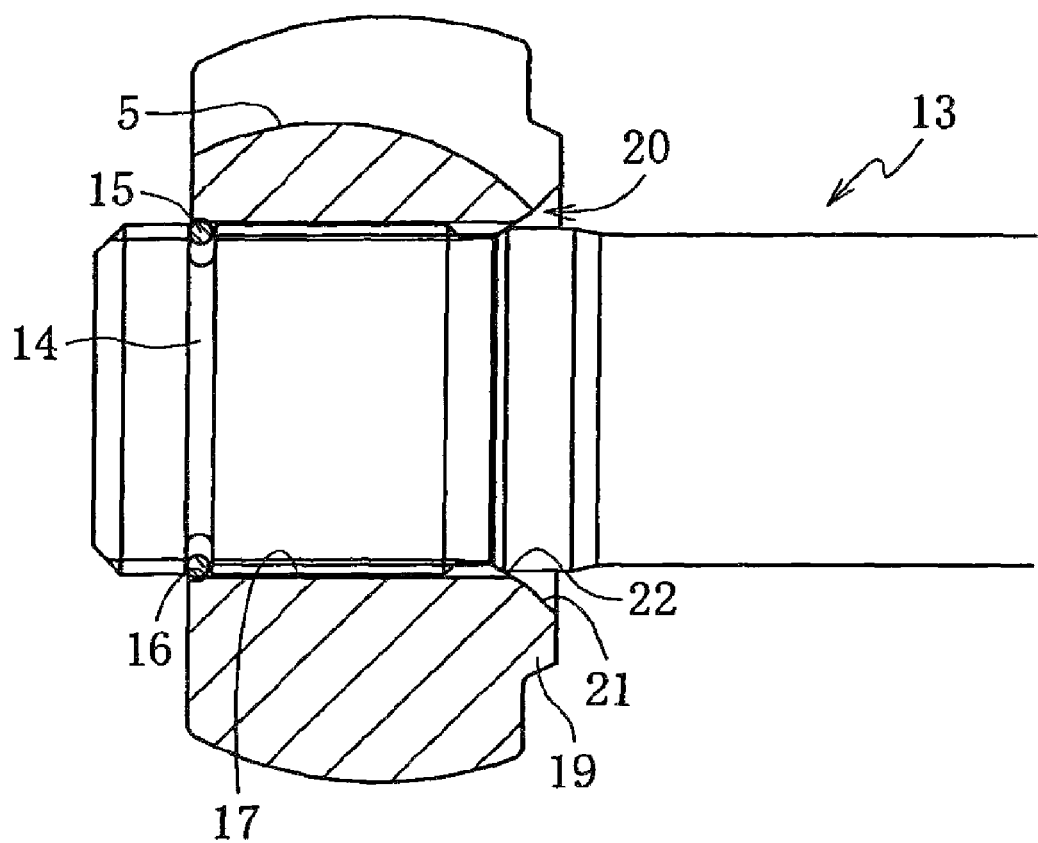
FIG. 6 shows a sectional view showing a state in which the insertion of the shaft into the inner race has been completed in the embodiment of the present invention, with the shaft being prevented from coming off by virtue of the circlip.
Figure 7:
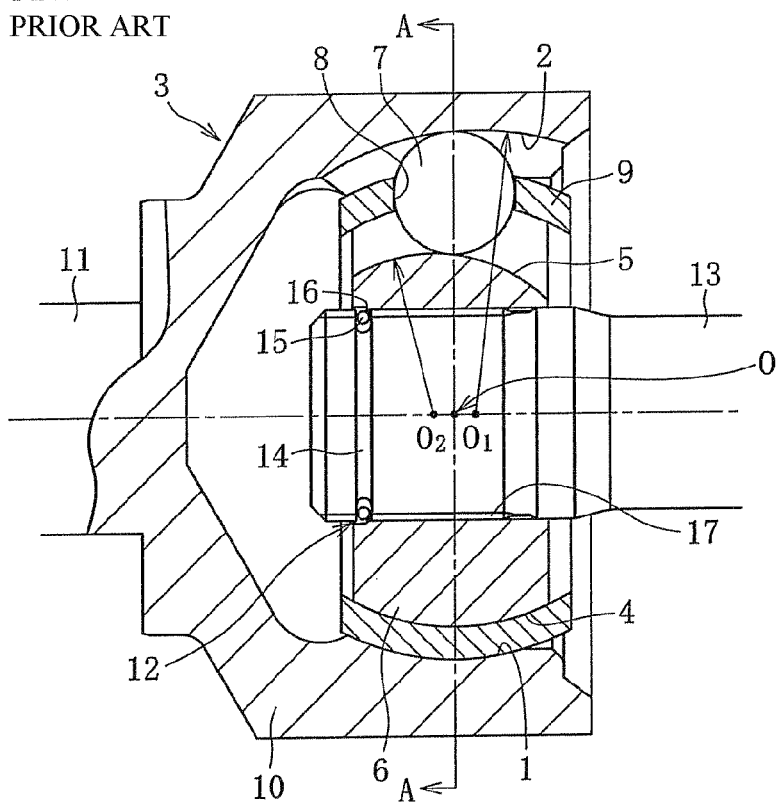
FIG. 7 shows a sectional view taken along the line B-O-B of FIG. 8, showing an example of the construction of a fixed-type conventional velocity universal joint.
Figure 8:
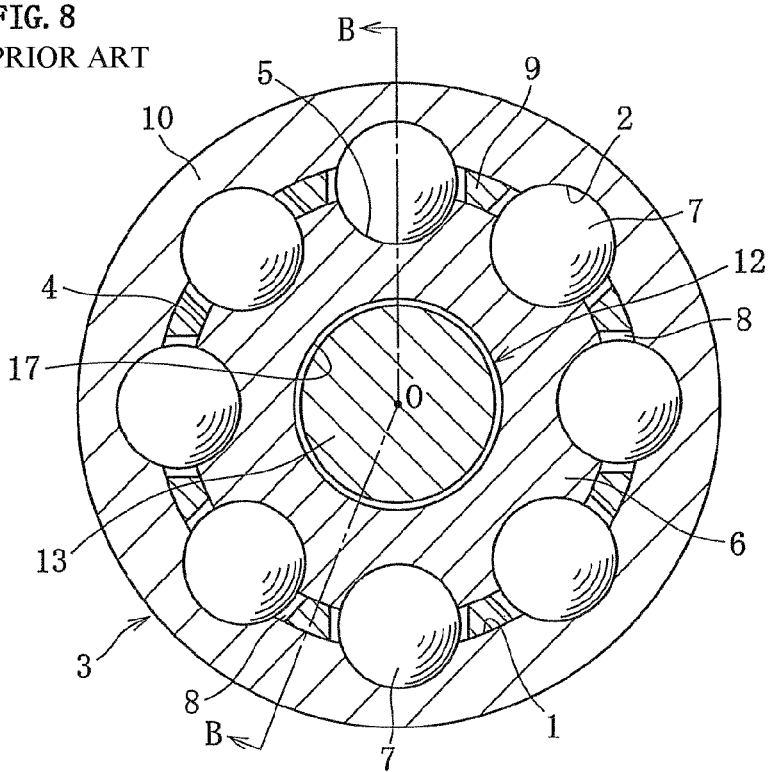
FIG. 8 shows a sectional view taken along the line A-A of FIG. 7.
Figure 9:
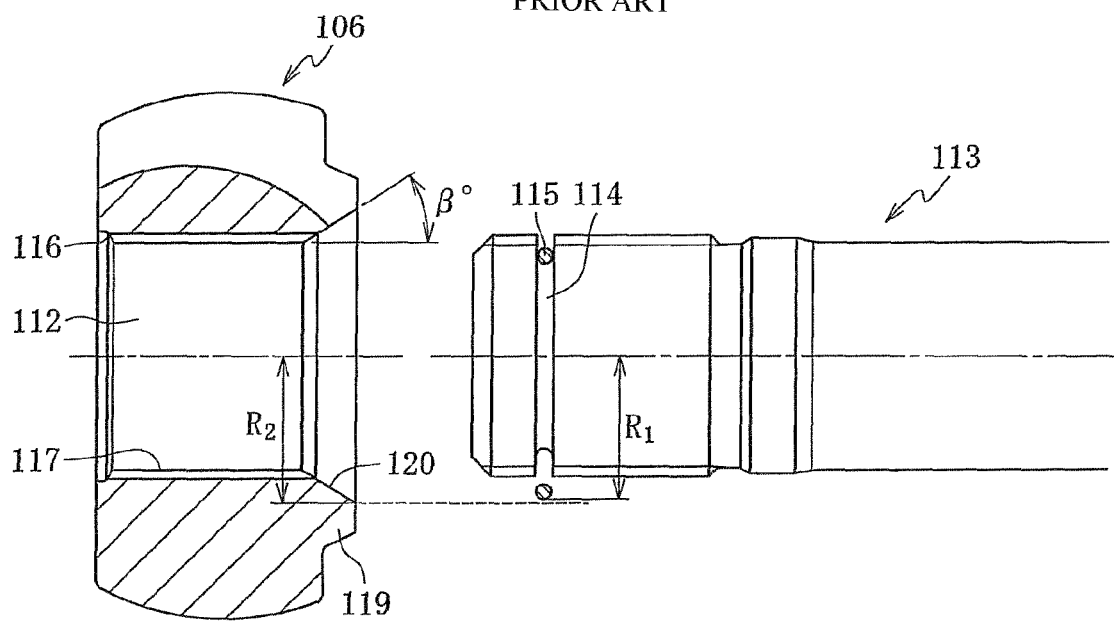
FIG. 9 shows a sectional view showing a state in which the shaft is arranged coaxially with respect to a conventional inner race.
Figure 10:
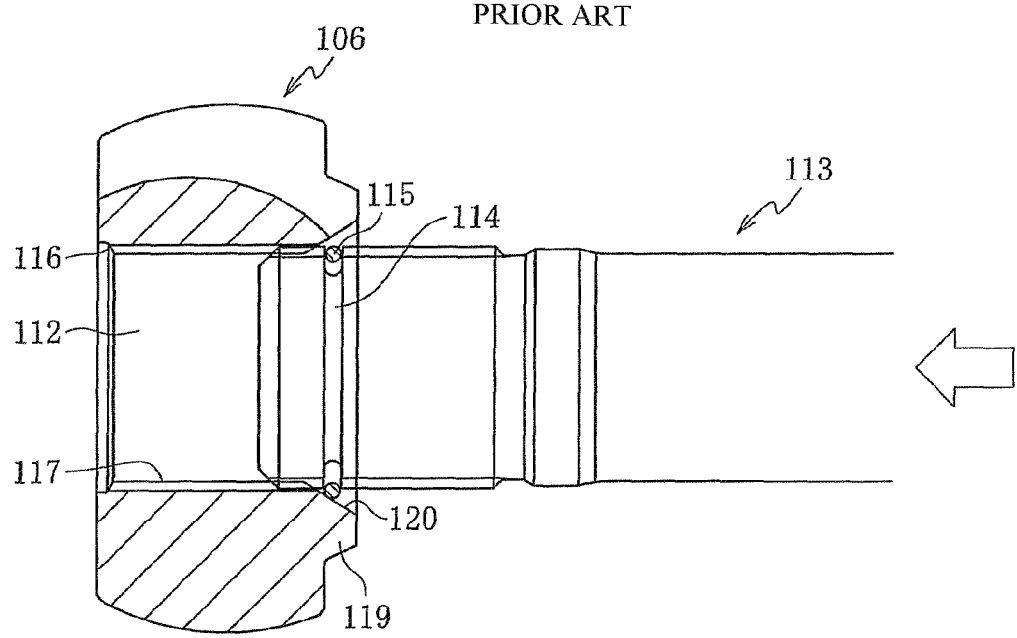
FIG. 10 shows a sectional view showing a state in which the shaft is inserted into the conventional inner race, with the circlip undergoing automatic alignment.
Figure 11:
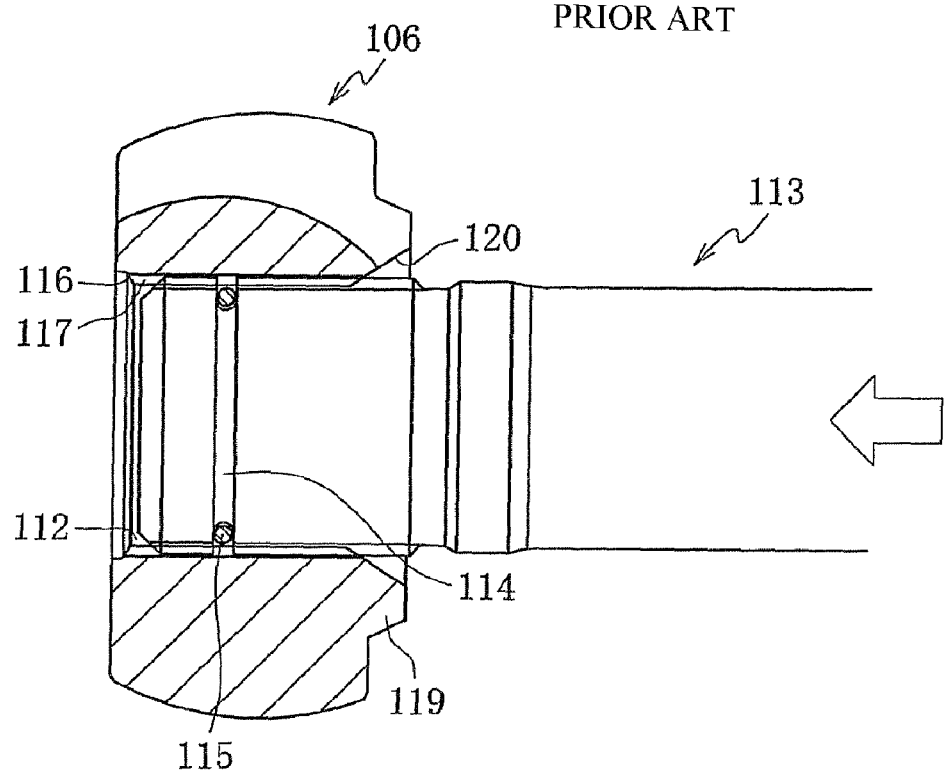
FIG. 11 shows a sectional view showing a state in which the shaft is inserted into the conventional inner race, with the circlip being reduced in diameter.
Figure 12:
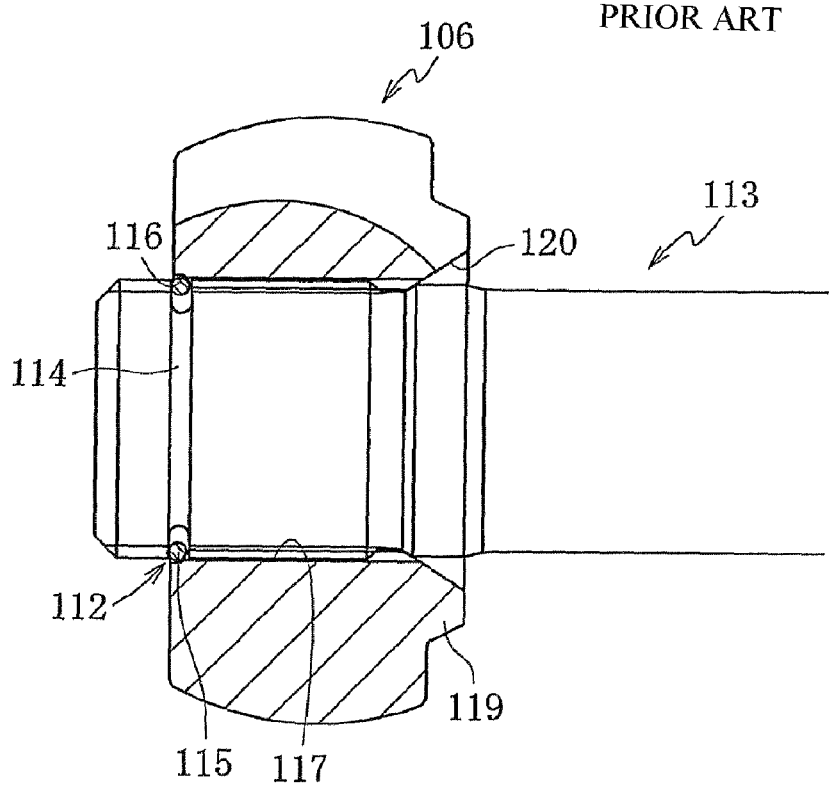
FIG. 12 shows a sectional view showing a state in which the insertion of the shaft into the conventional inner race has been completed, with the shaft being prevented from coming off by virtue of the circlip.

3 outer member (outer race)
6 inner member (inner race)
7 torque transmission member (ball)
12 shaft hole
13 shaft
15 lock member (circlip)
20 two-step chamfer
21 first chamfer section
22 second chamfer section
$\alpha$ chamfer angle of first chamfer section
$\beta$ chamfer angle of second chamfer section

The invention claimed is:

1. A constant velocity universal joint, comprising:
   a shaft;
   a lock member;
   an outer member;
   an inner member; and
   a torque transmission member intervening between the outer member and the inner member to transmit torque,
   wherein the inner member comprises
   (i) a shaft hole formed in the inner member for spline-fitting a shaft to the inner member by inserting the shaft into the shaft hole so as to prevent the shaft from coming off by the lock member,
   (ii) a protrusion provided at a shaft insertion side end portion of the inner member, and
   (iii) a two-step chamfer of different chamfer angles provided at the shaft insertion side end portion of the shaft hole,
   wherein the two-step chamfer includes a first chamfer section situated on a shaft hole opening side of the inner member and a second chamfer section provided on a side opposite to the shaft hole opening so as to be continuous with the first chamfer section,
   wherein the chamfer angle of the first chamfer section is larger than the chamfer angle of the second chamfer section, wherein the first chamfer section is provided at an inner peripheral surface of the protrusion, and the first chamfer section automatically aligns the locking member and the second chamfer section reduces a diameter of the locking member, wherein the first chamfer section meets the second chamfer section at a boundary portion disposed between the first chamfer section and the second chamfer section, wherein a radius of the boundary portion is larger than a maximum radius of the lock member, wherein the shaft is spline-fitted to the inner member by inserting the shaft into the shaft hole such that the lock member prevents the shaft from coming off.

2. A constant velocity universal joint according to claim 1, wherein the first chamfer section has a chamfer angle of 32.6° to 60°, and wherein the second chamfer section has a chamfer angle of 15° to 32.5°.

3. A constant velocity universal joint according to claim 1, wherein the first chamfer section extends contiguously from the second chamfer section.

4. A constant velocity universal joint according to claim 1, wherein the shaft is spline-fitted to the inner member by inserting the shaft into the shaft hole such that the lock member passes over the first chamfer section and the second chamfer section.

5. A constant velocity universal joint according to claim 1, wherein the shaft is spline-fitted to the inner member by inserting the shaft into the shaft hole such that the lock member passes over the first chamfer section and the second chamfer section, and the lock member abuts against a side of the inner member opposite to the shaft insertion side.

6. A constant velocity universal joint according to claim 1, wherein the inner member includes a step portion on an opposite side of the second chamfer section from the first chamfer section, and the lock member is held in the step portion to prevent the shaft from coming off.

7. A constant velocity universal joint, comprising:
a shaft;
a lock member;
an outer member;
an inner member; and
a torque transmission member intervening between the outer member and the inner member to transmit torque,
wherein the inner member comprises
(i) a shaft hole formed in the inner member for spline-fitting a shaft to the inner member by inserting the shaft into the shaft hole so as to prevent the shaft from coming off by the lock member,
(ii) a protrusion provided at a shaft insertion side end portion of the inner member, and
(iii) a two-step chamfer of different chamfer angles provided at the shaft insertion side end portion of the shaft hole, wherein the two-step chamfer includes a first chamfer section situated on a shaft hole opening side of the inner member and a second chamfer section provided on a side opposite to the shaft hole opening so as to be continuous with the first chamfer section, wherein the chamfer angle of the first chamfer section is larger than the chamfer angle of the second chamfer section, wherein the first chamfer section is provided at an inner peripheral surface of the protrusion, and the first chamfer section automatically aligns the locking member and the second chamfer section reduces a diameter of the locking member, wherein the second chamfer section is provided at an inner peripheral surface of an inside portion axially inward from the protrusion, wherein the first chamfer section meets the second chamfer section at a boundary portion disposed between the first chamfer section and the second chamfer section, wherein a radius of the boundary portion is larger than a maximum radius of the lock member, wherein the shaft is spline-fitted to the inner member by inserting the shaft into the shaft hole such that the lock member prevents the shaft from coming off.

8. A constant velocity universal joint according to claim 7, wherein the first chamfer section has a chamfer angle of 32.6° to 60°, and wherein the second chamfer section has a chamfer angle of 15° to 32.5°.

9. A constant velocity universal joint according to claim 7, wherein the first chamfer section extends contiguously from the second chamfer section.

10. A constant velocity universal joint according to claim 7, wherein the shaft is spline-fitted to the inner member by inserting the shaft into the shaft hole such that the lock member passes over the first chamfer section and the second chamfer section.

11. A constant velocity universal joint according to claim 7, wherein the shaft is spline-fitted to the inner member by inserting the shaft into the shaft hole such that the lock member passes over the first chamfer section and the second chamfer section, and the lock member abuts against a side of the inner member opposite to the shaft insertion side.

12. A constant velocity universal joint according to claim 7, wherein the inner member includes a step portion on an opposite side of the second chamfer section from the first chamfer section, and the lock member is held in the step portion to prevent the shaft from coming off.

* * * * *